United States Patent Office 3,746,701
Patented July 17, 1973

3,746,701
METHOD FOR THE PRODUCTION OF BENZO-
DIAZEPINE DERIVATIVES
Hiroyuki Tawada, Kyoto, Hideaki Natsugari, Osaka, and
Kanji Meguro and Yutaka Kuwada, Hyogo, Japan,
assignors to Takeda Chemical Industries, Ltd., Osaka,
Japan
No Drawing. Filed July 27, 1971, Ser. No. 166,627
Claims priority, application Japan, Aug. 1, 1970,
45/67,447, 45/67,448
Int. Cl. C07d 53/06
U.S. Cl. 260—239.3 D                12 Claims

ABSTRACT OF THE DISCLOSURE

Compounds of the formula

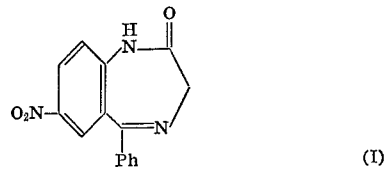

wherein Ph represents a substituted or unsubstituted phenyl group are prepared by reacting a compound of the formula

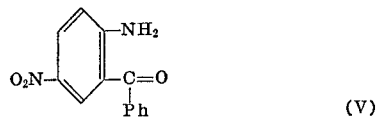

with a compound of the formula $$XCH_2C(OR)_3 \quad (VI)$$

wherein X represents a halogen atom and R represents a lower alkyl group, to produce a compound of the formula

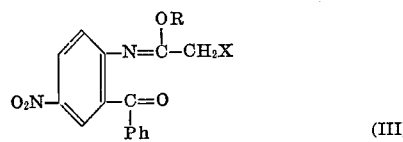

reacting said Compound III with ammonia to produce a compound of the formula

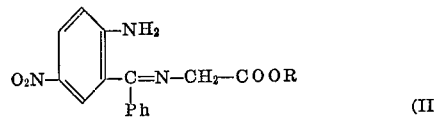

and subjecting said Compound II to a ring-closure reaction. Compounds I are useful as tranquilizer or hypnotic agents or as intermediates for other medicines. Compounds III are novel products.

The present invention relates to a method for the production of benzodiazepine derivatives, and more particularly to a novel and industrially feasible method for the production of benzodiazepine derivatives of the following general Formula I, which are useful as medicines, such as effective tranquilizers, hypnotics, or intermediates for other various kinds of medicines

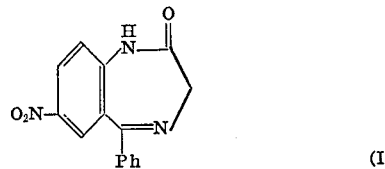

wherein Ph stands for a substituted or unsubstituted phenyl group. The invention also provides novel compounds which are useful, inter alia, as intermediates in the production of Compounds I.

The method of the present invention, by which the above object Compounds I can be produced, comprises reacting a compound of the general Formula V

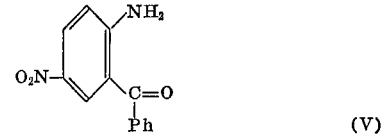

wherein Ph has the same meaning as above with a compound of the general Formula IV $$XCH_2C(OR)_3$$

wherein X stands for a halogen atom, and R stands for a lower alkyl group to give a compound of the general Formula III

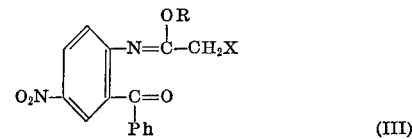

wherein Ph, R and X have the same meaning as above, reacting the compound of the general Formula III with ammonia to give a compound of the general Formula II

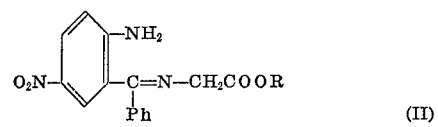

wherein Ph and R have the same meaning as above, and finally subjecting the compound of the general Formula II to ring-closure reaction to give the object Compound I.

Reactions involved in the present method are shown in the following scheme:

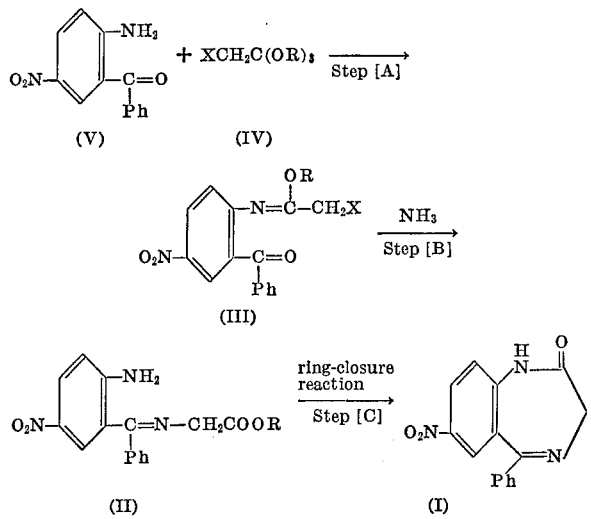

wherein Ph, R and X have the same meaning as above.

There have been reported a number of methods for the production of the Compounds I. However, the known methods for the production of the Compounds I are not very satisfactory from an industrial point of view such as yield, handling of intermediates and complexity of the processes.

Under these circumstances, the present inventors have made extensive studies for developing novel and advantageous routes for the production of the Compounds I.

As the result of the studies, the present inventors have found that an unexpected intramolecular rearrangement occurs when a compound of the aforementioned Formula III, novel compounds synthesized for the first time by the present inventors, is reacted with ammonia. As the result, the Compound II is produced in a high yield.

This finding is quite unexpected and beyond the state of the art at the present stage, since the most reasonable assumption from the present state of the art is that the reaction of the Compound III with ammonia would give the compound of the general Formula VI

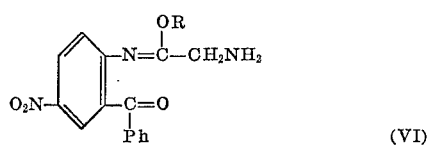

(VI)

wherein Ph and R have the same meaning as above, and such rearrangement as involved in the present method or its analogous rearrangement has never been reported so far as the present inventors are aware.

Thus, the reaction of Step [B] of the present invention can be concluded as quite a novel and unique one, because of the unexpected rearrangement involved therein.

Further studies on the Compound II has reached a finding that the Compound II is easily susceptible to ring-closure reaction to give the Compound I in a high yield.

Moreover, the aforementioned Step [A], Step [B] and Step [C] can continuously be conducted without separation or purification of the respective intermediates.

The present invention has been accomplished on the basis of these findings. Thus, according to the present method, the object compounds of the general Formula I can be easily produced in a high yield by simple processes, and therefore the present method is remarkably feasible, effective and advantageous from an industrial point of view.

Namely, a principal and essential object of the present invention is to provide a novel and industrially feasible method for the production of the Compounds I, and this object can be attained by the method described in detail hereinafter.

In the above general formulas, where the symbol Ph is a substituted phenyl group, the substituent includes, for example, a halogen atom (e.g. chlorine, bromine, iodine, fluorine), a hydroxy group, a nitro group, a trifluoromethyl group, a lower alkyl group (e.g. methyl, ethyl, propyl, isopropyl, butyl) and a lower alkoxy group (e.g. methoxy, ethoxy, propoxy). One or more of these substituents, which are same or different, may occupy optional position(s) of the phenyl nucleus. The halogen atom represented by the symbol X includes, for example, chlorine, bromine and iodine. As the lower alkyl group represented by the symbol R, one having 1 to 4 carbon atoms is preferred, which includes methyl, ethyl, propyl, isopropyl, butyl and isobutyl.

The reaction of Step [A] is carried out by reacting a Compound V with a Compound IV. The amount of a Compound IV is at least one mole, more preferably about 1.5 to about 3 moles per mole of a Compound V. The reaction proceeds even in the absence of any solvent or catalyst, but use of a suitable solvent and/or a catalyst is preferable. Suitable solvents include, for example, benzene, toluene, xylene, carbon tetrachloride, chloroform, methylene chloride and a mixture of two or more thereof, and the catalyst preferably used includes acidic compounds such as organic acids (e.g. acetic acid, p-toluenesulfonic acid) and inorganic acids (e.g. hydrochloric acid, and sulfuric acid). The amount of the catalyst is generally about 1 to about 8 moles, more preferably about 2 to about 3 moles per mole of a Compound V. The reaction is generally conducted ranging from room temperature to boiling point of the solvent used.

In case where the Compound III thus produced is that wherein the halogen atom represented by the symbol X is chlorine or bromine, it is preferable for enhancing the reactivity with ammonia to convert the same into a Compound III wherein X is iodine by treatment with an alkali metal salt of hydroiodic acid (e.g. potassium iodide and sodium iodide) in a suitable solvent such as acetone, alcohols (e.g. methyl alcohol and ethyl alcohol).

Thus produced Compound III may be, if necessary, isolated after a conventional means (e.g. extraction and distillation), but the reaction mixture, as it is, of Step [A] can be used as a starting material of the next reaction Step [B].

The reaction of Step [B] is carried out by reacting a Compound III with ammonia. Ammonia usable in the present reaction may be any of liquid ammonia, gaseous ammonia and an aqueous solution of ammonia, among which liquid ammonia is most preferable. The amount of ammonia is generally an excess molar amount.

The reaction may be preferably conducted in a suitable solvent or in an excess amount of liquid ammonia which acts also as a solvent, at room temperature or below, if necessary, in a sealed vessel. Typical examples of the solvent are alcohols (e.g., methyl alcohol and ethyl alcohol), halogenomethane (e.g., dichloromethane and chloroform), ethyl acetate, ether, benzene, dimethylformamide, a mixture of two or more thereof, and a mixture with water.

The reaction product of Step [B] can be identified as the compound of the general Formula II by the data of infrared absorption spectrum, nuclear magnetic resonance spectrum and elementary analysis. In respect to the Compound II, two geometrical isomers, namely a syn-form shown by the general Formula II–a and an anti-form shown by the general Formula II–b exist

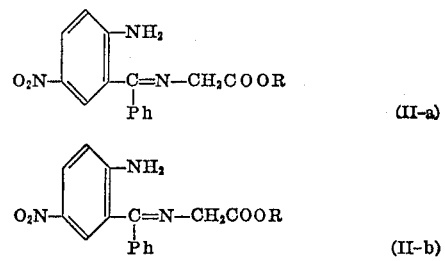

wherein Ph and R have the same meaning as above.

But one of the isomers is preferentially formed in the reaction of Step [B]. This isomer is identified as syn-form II–a, which is a preferable form for ring-closure reaction in the next Step [C]. The syn-form can easily be converted into the anti-form by heating in a suitable solvent such as benzene, toluene, and xylene, generally at the boiling point thereof. This isomerization gradually proceeds even at room temperature.

These two geometrical isomers can be discriminated from each other by the data of nuclear magnetic resonance spectrum (in DMSO-$d_6$):

syn-form of the general Formula II–a: $\delta = 6.33$ p.p.m. (due to —$NH_2$)
anti-form of the general Formula II–b: $\delta = 8.95$ p.p.m. (due to —$NH_2$)

Judging from these data of nuclear magnetic resonance spectrum, it is supposed that the protons due to —$NH_2$ of anti-form appear at lower field than the protons due to —$NH_2$ of syn-form, because of an intramolecular hydrogen bond in the anti-form.

As a starting material of the next reaction of Step [C], either of these two geometrical isomers or a mixture thereof may be used. The reaction mixture, as it is, of Step [B] can be used as a starting material of the next Step [C] without any procedure for isolation or purification.

The reaction of Step [C] is carried out by subjecting a Compound II to ring-closure reaction. The ring-closure reaction may be conducted by treating a Compound II with an acid or a basic substance such as an imidazole derivative, an alkali metal alcoholate and an alkali metal hydroxide at room temperature or under heating, if necessary. As the alkali metal alcoholate, methylate or ethylate of potassium or sodium is preferable, and as the alkali metal hydroxide, potassium hydroxide and sodium hydroxide is preferable.

The amount of the alkali metal alcoholates or alkali metal hydroxides is generally about 1 to about 1.5 moles per mole of a Compound II.

Where the alkali metal compound is employed, the reaction of Step [C] is preferably conducted at room temperature, in a suitable solvent such as alcohols (e.g. methyl alcohol, ethyl alcohol, propyl alcohol and isopropyl alcohol).

As mentioned before, syn-form of a Compound II is preferentially produced in Step [B]. Thus Step [C] proceeds smoothly under these mild conditions.

The imidazole derivatives include, for example, imidazole, 2-methylimidazole and 2-ethylimidazole. The amount of the imidazole derivatives is generally about 1 to about 5 moles per mole of a Compound II. Where the imidazole derivative is employed, the reaction of Step [C] is conducted by heating a Compound II with the imidazole derivative at about 100 to about 200° C., more preferably at about 120 to about 150° C.

Under these conditions, the reaction proceeds smoothly regardless of geometric isomers of a Compound II.

The acid is exemplified by an organic acid such as acetic acid and propionic acid and inorganic acid such as hydrochloric acid. The amount of the acid is generally from about 2 moles to a large excess moles per mole of a Compound II.

Thus produced object Compound I is easily isolated and purified after per se conventional means such as neutralization, filtration, extraction with a suitable solvent (e.g. ethyl acetate, dichloromethane, chloroform).

As described in detail in the foregoing, by the method of the present invention, the compounds of the general Formula I useful as an effective tranquilizer or hypnotic agents or as intermediates for other various kinds of medicines can be produced in a high yield by simple procedures.

For further explanation of the present invention, the following examples are given, wherein the word "part(s)" is based on weight unless otherwise noted and the relationship between "part(s)" and "volume part(s)" corresponds to that between "gram(s)" and "milliliter(s)."

EXAMPLE (A) Step [A]

(i) To a mixture of 40 volume parts of benzene and 2.42 parts of 2-amino-5-nitrobenzophenone are added 9.64 parts of ethyl orthobromoacetate and 3 parts of acetic acid, followed by heating under refluxing for 7 hours. The reaction mixture is washed at first with a saturated aqueous sodium bicarbonate solution and then with water, dried over sodium sulfate and subjected to distillation under reduced pressure. This procedure gives 2-(2-bromo-1-ethoxyethylideneamino)-5-nitrobenzophenone as an oily substance.

After a similar manner to the above, 2-(2-bromo-1-methoxyethylideneamino)-5-nitrobenzophenone (melting point: 90 to 91° C.) is obtained as pale yellow plates by employing methyl orthobromoacetate instead of ethyl orthobromoacetate.

(ii) To a solution of 3.9 parts of 2-(2-bromo-1-ethoxyethylideneamino)-5-nitrobenzophenone in 20 volume parts of acetone is added a solution of 1.6 parts of sodium iodide in 15 volume parts of acetone, followed by stirring at room temperature for 1 hour.

The separated precipitates are removed off by filtration, and the filtrate is concentrated under reduced pressure to give quantitatively 2-(1-ethoxy-2-iodoethylideneamino)-5-nitrobenzophenone as an oily substance.

(B) Step [B]

(i) To a solution of 1.95 parts of 2-(2-bromo-1-ethoxyethylideneamino)-5-nitrobenzophenone in 25 volume parts of dichloromethane is added 5 volume parts of liquid ammonia, followed by keeping at room temperature for 40 minutes. The dichloromethane layer is washed with water, dried over sodium sulfate and subjected to distillation to remove the solvent. The residue is washed with ethyl ether and then dried, whereby 2-amino-5-nitro-α-phenylbenzilideneaminoacetic acid ethyl ester is obtained as yellow crystals. Recrystallization from chloroform gives yellow prisms melting at 163 to 164° C.

After a similar manner to the above, 2-amino-5-nitro-α-phenylbenzilideneaminoacetic acid methyl ester is obtained as yellow prisms melting at 155 to 157° C. from 2-(2-bromo-1-methoxyethyleneamino)-5-nitrobenzophenone.

(ii) To a solution of 2 parts of 2-(1-ethoxy-2-iodoethylideneamino)-5-nitrobenzophenone in 50 volume parts of dichloromethane is added 20 volume parts of liquid ammonia, and the mixture is stirred at room temperature for 1.5 hours. The dichloromethane layer is washed with a saturated aqueous sodium bicarbonate solution and water in this order, dried over sodium sulfate and then subjected to distillation to remove the solvent. The residue is washed with ethyl ether and dried to give 2-amino-5-nitro-α-phenylbenzilideneaminoacetic acid ethyl ester as yellow crystals. Recrystallization from chloroform gives yellow prisms melting at 163 to 164° C.

(iii) 2-amino-5-nitro-α-phenylbenzilideneaminoacetic acid ethyl ester obtained in the above procedure is heated in xylene under reflux for 1.5 hours, followed by subjecting to distillation under reduced pressure. The resulting crystals are recrystallized from ethyl ether to give yellow needles melting at 136 to 137° C. Thus obtained needles are considered as the geometrical isomer of the starting ethyl ester.

(C) Step [C]

(i) A mixture of 1.09 parts of 2-amino-5-nitro-α-phenylbenzilideneaminoacetic acid ethyl ester melting at 163 to 164° C., which is obtained in Step [B]–(i) or (ii), and 0.82 part of 2-methylimidazole is heated at 140° C. for 45 minutes. After cooling, to the reaction mixture is added water, and the whole mixture is extracted with ethyl acetate. The ethyl acetate layer is washed with water, dried and subjected to distillation to remove the solvent. The residue is washed with ethyl alcohol, whereby 7-nitro-5-phenyl-1,3-dihydro-2H-1,4-benzodiazepin-2-one is obtained as crystals melting at 222 to 223° C. Recrystallization from ethyl alcohol gives pale yellow flakes melting at 224 to 225° C.

(ii) A mixture of 1.09 parts of 2-amino-5-nitro-α-phenylbenzilideneaminoacetic acid ethyl ester melting at 136 to 137° C., which is produced in Step [B]–(iii), and 0.82 part of 2-methylimidazole is heated at 140° C. for 40 minutes. After cooling, the resulting mixture is recrystallized from aqueous ethyl alcohol to give 7-nitro-5-phenyl-1,3-dihydro-2H-1,4-benzodiazepin-2-one as yellow crystals. Recrystallization from ethyl alcohol gives pale yellow flakes melting at 224 to 225° C.

(iii) To a solution of 0.28 part of metallic sodium in 45 volume parts of methyl alcohol is added 3.13 parts of 2-amino-5-nitro-α-phenylbenzilideneaminoacetic acid methyl ester melting at 155 to 157° C., followed by stirring at room temperature for 20 minutes. After distillation of the solvent under reduced pressure, to the residue is added 30 volume parts of water. To the whole mixture is added 10 weight percent hydrochloric acid until the pH value of the system becomes 8.0, and the precipitates are filtered, washed with water and dried, whereby 7-nitro-5-phenyl - 1,3 - dihydro-2H-1,4-benzodiazepin-2-one is obtained as pale yellow crystals melting at 223 to 224° C.

After a similar manner to the above, 7-nitro-5-phenyl-1,3 - dihydro-2H-1,4-benzodiazepin-2-one is obtained by employing sodium ethylate, and potassium methylate, respectively, instead of sodium methylate.

(iv) To a solution of 0.67 part of potassium hydroxide in 30 volume parts of methyl alcohol is added 3.1 parts of 2 - amino-5-nitro-α-phenylbenzilideneaminoacetic acid methyl ester melting at 155 to 157° C., followed by stirring at room temperature for 20 minutes. The reaction mixture is subjected to distillation under reduced pressure, and to the residue is added 30 volume parts of water. To the whole mixture is added 10 weight percent hydrochloric acid until the pH value of the system becomes 8.0, and the precipitates are filtered, washed with water and dried, whereby 7-nitro-5-phenyl-1,3-dihydro-2H-1,4-benzodiazepin-2-one is obtained as pale yellow crystals melting at 223 to 224° C.

What is claimed is:

1. A method for the production of a compound of the formula:

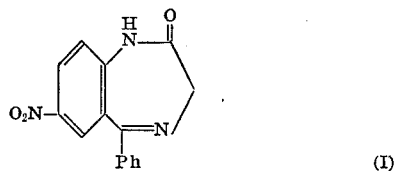

wherein Ph is an unsubstituted phenyl or phenyl substituted by a member selected from the group consisting of a halogen, hydroxy, nitro, trifluoromethyl, lower alkyl and lower alkoxy, which comprises
(A) reacting a compound of the formula:

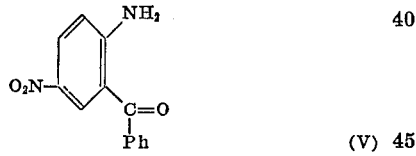

wherein Ph has the same meaning as above, with a compound of the formula:

$$XCH_2C(OR)_3 \quad (IV)$$

wherein X represents a halogen atom and R represents lower alkyl in the presence of a catalyst under heating to produce a compound of the formula:

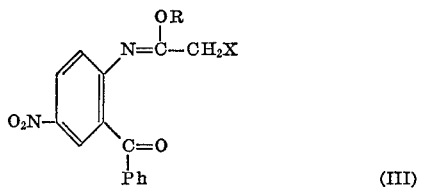

wherein Ph, R and X have the same meanings as above,
(B) reacting the thus-produced compound with liquid ammonia at a temperature around room temperature to give a compound of the formula:

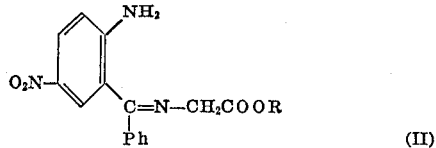

wherein Ph and R have the same meaning as above and
(C) subjecting the latter compound to a ring-closure reaction in the presence of an acidic or basic compound.

2. A method according to claim 1 wherein reaction (B) is conducted in the presence of a solvent and wherein the reaction proceeds under heating conditions at temperatures up to but not exceeding the boiling point of the solvent.

3. A method according to claim 1 wherein the compound $XCH_2C(OR)_3$ in step (A) is used in molar excess of Compound V.

4. A method according to claim 1 wherein the catalyst used in step (A) is an inorganic or organic acid.

5. A method according to claim 4 wherein the catalyst is used in an excess amount up to 8 moles per mole of Compound V.

6. A method according to claim 4 wherein the catalyst is selected from the group consisting of acetic acid, p-toluenesulfonic acid, hydrochloric acid and sulfuric acid.

7. A method according to claim 1 wherein at least one mole of $XCH_2C(OR)_3$ is used per mole of Compound V.

8. A method according to claim 1 wherein an excess amount of liquid ammonia is used in step (B).

9. A method according to claim 1 wherein the reaction in step (C) proceeds at room temperature or under heating conditions.

10. A method as claimed in claim 1, wherein the ring-closure reaction is conducted by treating a compound of the formula

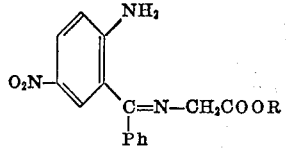

wherein Ph represents substituted or unsubstituted phenyl, and R represents lower alkyl, with a basic substance.

11. A method as claimed in claim 1, wherein Ph is unsubstituted phenyl.

12. A method as claimed in claim 1, wherein Ph is phenyl, substituted by a member selected from the group consisting of halogen, hydroxy, nitro, trifluoromethyl, lower alkyl and lower alkoxy.

References Cited
UNITED STATES PATENTS 3,516,988   6/1970   Schmitt ———————— 260—239.3 D HENRY R. JILES, Primary Examiner R. T. BOND, Assistant Examiner U.S. Cl. X.R.

260—471 A